United States Patent
Lucken

(10) Patent No.: US 7,866,279 B2
(45) Date of Patent: Jan. 11, 2011

(54) BEAR TRAINING APPARATUS AND METHOD

(76) Inventor: Michael J. Lucken, 29686 Kranz Lake Cir., Albany, Stearns, MN (US) 56307

(*) Notice: Subject to any disclaimer, the term of this patent is extended or adjusted under 35 U.S.C. 154(b) by 637 days.

(21) Appl. No.: 11/532,479

(22) Filed: Sep. 15, 2006

(65) Prior Publication Data

US 2007/0068459 A1 Mar. 29, 2007

Related U.S. Application Data

(60) Provisional application No. 60/717,940, filed on Sep. 15, 2005.

(51) Int. Cl.
*A01K 5/02* (2006.01)

(52) U.S. Cl. ..................... 119/51.12

(58) Field of Classification Search ... 119/51.11–51.15, 119/57.92
See application file for complete search history.

(56) References Cited

U.S. PATENT DOCUMENTS

| | | | |
|---|---|---|---|
| 122,914 A | 1/1872 | Ruggles | |
| 1,442,382 A | 1/1923 | Bullock | |
| 3,638,618 A | 2/1972 | Strother | |
| 3,646,913 A | 3/1972 | Jenkins | |
| 3,763,825 A | 10/1973 | Fleming | |
| 3,900,007 A | 8/1975 | Smith | |
| 3,985,104 A | 10/1976 | Klemer | |
| 4,164,200 A | 8/1979 | Gambling | |
| 4,185,588 A * | 1/1980 | Harris | 119/51.12 |
| 4,248,175 A | 2/1981 | Navarro | |
| 4,665,863 A * | 5/1987 | Toledo | 119/51.13 |
| 4,722,300 A * | 2/1988 | Walker et al. | 119/51.11 |
| 4,733,634 A * | 3/1988 | Hooser | 119/51.12 |
| 4,989,547 A | 2/1991 | Eaton | |
| 5,029,408 A | 7/1991 | Smith | |
| 5,129,361 A | 7/1992 | Deutsch et al. | |
| 5,140,944 A | 8/1992 | Jeng | |
| 5,143,289 A | 9/1992 | Gresham et al. | |
| 5,150,664 A | 9/1992 | Kirk | |
| 5,176,103 A | 1/1993 | Reid et al. | |
| 5,200,891 A * | 4/1993 | Kehr et al. | 221/2 |
| 5,239,943 A * | 8/1993 | Kim | 119/51.12 |
| 5,265,560 A | 11/1993 | Dobbins | |
| 5,299,376 A | 4/1994 | Roberts | |

(Continued)

FOREIGN PATENT DOCUMENTS

FR 2584208 A1 * 1/1987

(Continued)

*Primary Examiner*—Son T. Nguyen
(74) *Attorney, Agent, or Firm*—Albert W. Watkins

(57) ABSTRACT

A device is described for training a wild bear to be at a particular location on a regular daily schedule that matches the hunter's hours. The device provides multiple food enclosures, a scent dispenser, and a timer. The timer causes one of the food enclosures to be opened at each set interval, and dispenses a scent to signal the bear that "dinner is served". The food enclosure which is opened will preferably only remain open for a limited time interval, for exemplary purposes one hour, so that the wild bear must be present at the scheduled time. Consequently, food is accessible only for one hour each day. The food enclosures are configured to allow a varied diet to be provided for the bear to keep him interested.

12 Claims, 1 Drawing Sheet

U.S. PATENT DOCUMENTS

| | | |
|---|---|---|
| 5,377,620 A | 1/1995 | Phillippi |
| 5,555,663 A | 9/1996 | Burgeson |
| 5,575,240 A | 11/1996 | Udelle et al. |
| 5,970,912 A | 10/1999 | Supple et al. |
| 6,082,300 A | 7/2000 | Futch |
| 6,273,027 B1 | 8/2001 | Watson et al. |
| 6,557,490 B1 | 5/2003 | Vaughn |
| 6,694,916 B1 | 2/2004 | Rucker et al. |
| 7,051,675 B1 * | 5/2006 | Mayer et al. ............. 119/51.11 |
| 7,159,539 B2 * | 1/2007 | Neckel .................... 119/51.02 |
| 2006/0191486 A1 * | 8/2006 | Mishler .................. 119/51.14 |

FOREIGN PATENT DOCUMENTS

JP    2005065674 A  *  3/2005

* cited by examiner

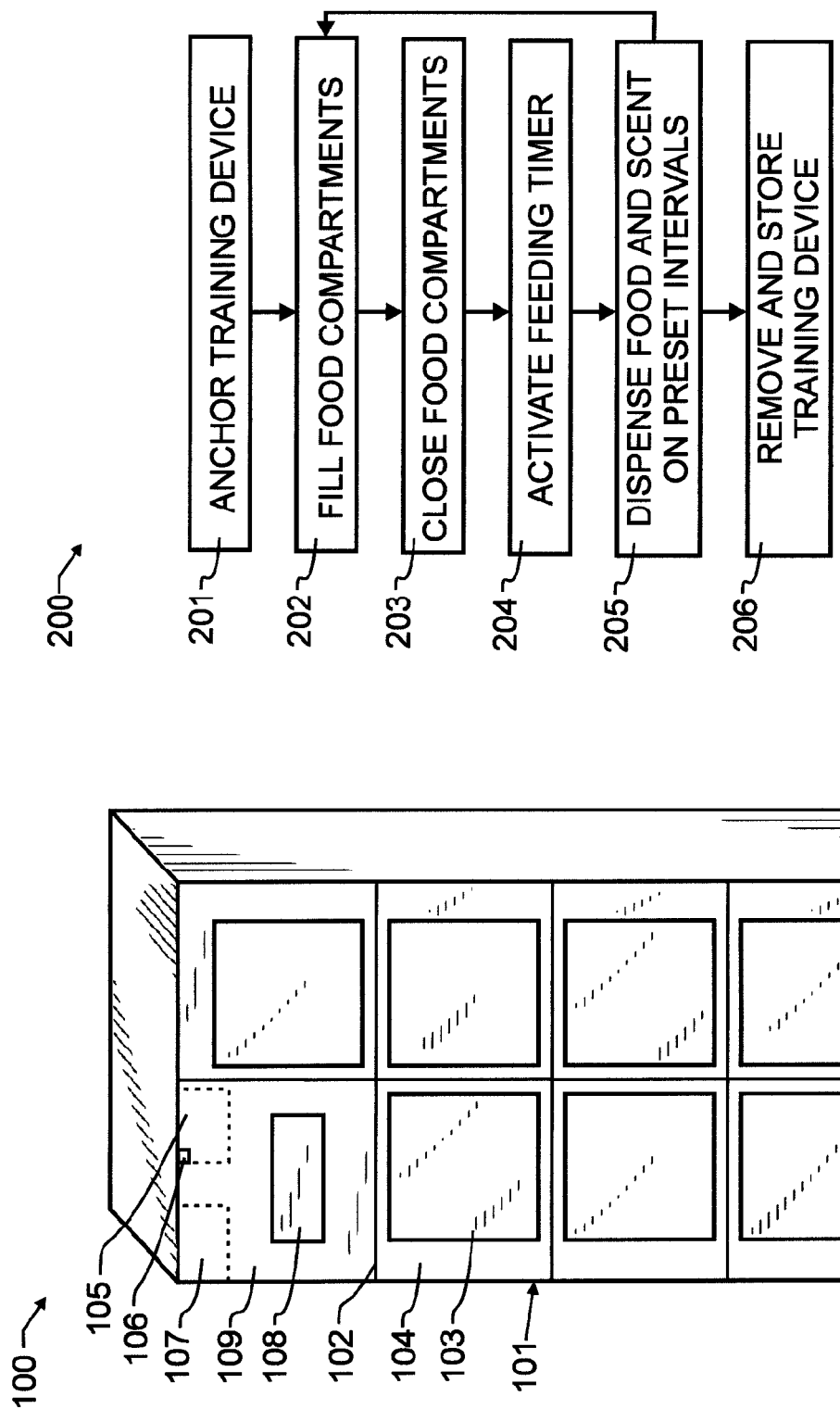

BEAR TRAINING APPARATUS AND METHOD

CROSS REFERENCE TO RELATED APPLICATIONS

This application claims priority to U.S. provisional patent application Ser. No. 60/717,940, filed Sep. 15, 2005 entitled "Bear Training Device" and of the same inventorship, the contents which are incorporated herein by reference in entirety.

BACKGROUND OF THE INVENTION

1. Field of the Invention

This invention pertains generally to animal controlling or handling, and more particularly to animal training. In a more particular manifestation, the present invention pertains to the training of wild bears to respond to a stimulus by coming to a feeder. The training will most preferably further include a time component.

2. Description of the Related Art

A bear is an omnivore, eating almost anything it finds from carrion, to live prey, to fruit and berries, to roots and greens. Bears will gladly eat grain also, being very fond of corn. Black bears are especially shy creatures and are in some cases nocturnal. This being the case, and since human hunters don't see or shoot well at night, to hunt bear a hunter has to know where the bear will be when it is light. Years ago, when land boundaries were less closely watched and the species less protected, this generally involved using dogs to roust the bear from his daytime nap or activity, and keep the bear at bay until the hunter could come. Today, maintenance of dogs is expensive, use of dogs is often frowned upon by landowners and non-bear-hunters, and some locales have outlawed the use of dogs to hunt bear. In response, hunters have baited bears with food. Unfortunately, the use of food as bait has only met with mixed success. The bear eats the food, but not necessarily on the hunter's schedule.

The hunter must bring the food and disturb the feeding area, leaving human scent and tracks that make the bear wary. As such, often the bear remains nocturnal even when being fed in this manner. If the bear is not nocturnal, it may carefully check for the hunter prior to entering the feeding area. The problem then is to train the bear to proceed to a food dispenser with minimal caution when some form of "dinner bell" stimulus signals the bear that a meal awaits it.

In patent literature, there are numerous timed animal food dispensers, and some training devices that dispense scent additionally. U.S. Pat. No. 6,273,027 by Watson et al, entitled "Automatic training device and method", is one example, the teachings which are incorporated herein by reference. This patent describes automated positive reinforcement training devices, including scent and scent combinations as a reinforcing element. This patent also addresses a multitude of subject types to be trained, including pets, zoo animals, and even humans. This patent, however, expects the detection of positive behavior before providing the rewarding element(s), and uses a timer as a lockout device to space the rewarding elements in time after a positive behavior has been detected. Consequently, there is no conception of luring an animal to a particular location at a particular time, nor of how to detect positive behavior in the wild.

Another exemplary patent, U.S. Pat. No. 6,694,916 by Rucker et al, entitled "Timed food-filled toy dispenser," the teachings which are incorporated herein by reference, describes a food toy dispenser that also makes noise, vibrates, and releases a scent. It describes a coordinated dispensing of scent and food-filled toys. It also describes the loading of the toys with food. Further, it describes different timer modes of random, behavior modification, and manually set delays between releases. Although this patent indicates a limited time interval for dispense, it does provide any teaching for predetermined times of day, nor for any sequencing. Instead, the Rucker et al patent is directed at preventing boredom of a pet by providing some degree of stimulation while an owner is away.

Another U.S. Pat. No. 4,989,547 by Eaton, entitled "Liquid and solid dispenser apparatus and method," the teachings which are incorporated herein by reference, is also exemplary. This patent describes a device with timer control of a scent and food dispenser. The feeder described is a pellet dispenser that applies a scent onto the pellets as they are dispensed. The desired quarry, a buck, is lured with a scent that holds the promise of mating. Upon arrival, however, the buck must settle for a free meal.

The literature also teaches the use of multiple door animal feeders, though for very different application from that desired in the present invention. One such patent, U.S. Pat. No. 3,763,825 by Fleming, entitled "Animal feeder," the teachings which are incorporated herein by reference, describes a device with feeder compartments and three doors opened on 24 hour intervals. The doors open downwards. The invention is described for feeding a cat when the owner is gone for an extended period. In U.S. Pat. No. 3,638,618 by Strother and entitled "Automatic pet feeder," the teachings which are incorporated herein by reference, a device is described having two inwardly opening doors on a timer, with a solenoid for opening the door and adding water to the food. The Strother patent is for similar application as the Fleming patent, that of providing for a pet during an extended owner absence. U.S. Pat. No. 1,442,382 by Bullock, entitled "Automatic feed box," the teachings which are incorporated herein by reference, describes a device using a clock winding a cord configured to sequence latches that in turn open bin lower doors to drop food for livestock from successive vertical feed bins to the ground. The box is configured to drop food daily for 8 successive days. This patent is again simply to provide feed to domestic animals over an extended feeding interval.

While these and similar patents contemplate training and extended feeding, none consider combining the features to train a bear to be in a particular location at a particular time, and none addresses the special needs of a bear.

SUMMARY OF THE INVENTION

While other stimuli are contemplated, since a bear has one of the best senses of smell in the animal kingdom, a preferred embodiment of the present invention seeks to use some form of scent as a "dinner bell". Further, it is advantageous and preferable to provide the bear a somewhat more varied diet than another copy of yesterday's leftovers to keep the bear interested in the food. By dispensing more interesting and desirable food on a schedule that more closely matches a desired schedule, the operator of the present training device can then train a bear to be in a known vicinity at a known time. Especially for hunting guides, this combination is extremely advantageous.

The preferred embodiment wild bear training device is a feeder designed to hold the large amount of food needed to keep a bear interested. The training device, its compartments, doors, and latch mechanisms must also be sturdy enough and designed with the strength and cunning of the bear in mind so the bear does not simply break its way into the wild bear training device to retrieve the food not yet presented for consumption. Further, the remainder of the wild bear training device must be designed with the understanding that a bear will likely attempt to break into the food compartments using any available approach, possibly damaging exposed or unprotected components in the process. In addition, owing to the outstanding sense of smell of the bear, any bear finding the training device will quickly determine what food is inside the unopened compartments. This ability to tell what is in the training device means that merely opening one of the compartments to make food available is not adequate, so an additional indicator is needed. This indicator must be readily distinguishable by the bear, and encourage investigation of the training device to find newly available food. Further, if a competing food source happens to match the day's menu, a trained bear should still first arrive at the training device just to see what the offering of the day is there prior to checking other food sources.

As such, a scent should be chosen that will not occur normally in the wild nor match other likely food bait sources. This scent is released to act as a "dinner bell" stimulus for the bear. The wild bear training device is characterized by a series of compartments each which are large enough to reasonably feed a bear, is of sturdy construction, with doors activated by a timer that open on a regular and pre-determined interval, and includes a scent dispenser activated by a timer to provide indication to a bear that a compartment door has been opened. In the preferred embodiment a single scent is dispensed coincident with the opening or unlocking of a door. A plurality of compartments are provided for the wild bear training device to minimize the amount of human interaction with the wild bear training device, so the likelihood of bear meeting human at an inopportune moment is reduced as is the frequency of maintenance. Further, the amount of human scent and movement in the vicinity of the wild bear training device is kept to a minimum by allowing for several days of operation without refilling.

In a first manifestation, the invention is a bear training apparatus suitable to train a bear to visit a specific location at a specific time interval. The apparatus has at least two feeding compartments, and may preferably have at least seven to provide food for each day of the week. A first one of the at least two feeding compartments has an enclosure blocking animal access to contents stored therein.

At least one access port in a first state permits access into the enclosure, for gaining access to the contents through the access port. In a second state, the at least one access port prevents access into the enclosure. A lock selectively maintains the access port in the second state, preventing access into the enclosure, when the lock is in a locked state. The lock permits the access port to change from the first state permitting access into the enclosure to the second state blocking access when the lock is in an unlocked state. A second one of the at least two feeding compartments is configured similarly to the first one. The apparatus also has a stimulus indicative of the availability of food, and a stimulus control generating the stimulus. A lock control is coupled with a first generating of the stimulus for changing the first feeding compartment lock from locked state to unlocked state and, after a first time interval, changing the first feeding compartment lock back from unlocked state to locked state. The lock control is coupled with a second generating of stimulus at a second time interval subsequent to changing the first feeding compartment lock from unlocked state to locked state, for changing the second feeding compartment lock from locked state to unlocked state.

In a second manifestation, the invention is a method of training a wild bear to visit, at predictable times, a wild bear feeding apparatus having a plurality of locking food compartments, a timer and a wild bear attractant stimulus. According to the method, wild bear food is placed within the plurality of food compartments. The plurality of food compartments are closed and locked. The elapse of a first time interval is determined, and responsive thereto the wild bear attractant stimulus is generated and a first one of the plurality of food compartments is unlocked, the unlocking being subsequent to placing, closing and locking. The elapse of a second interval subsequent to the first interval elapse is determined, and responsive thereto, the first one of the plurality of food compartments is locked. The elapse of a third interval subsequent to the second interval elapse is determined, and a second one of the plurality of food compartments is unlocked responsive thereto.

In a third manifestation, the invention is a method of unsupervised animal training which trains said animal to visit a feeding apparatus having a plurality of locking food compartments responsive to an attractant stimulus within a predictable time interval from a predictable time. According to the method, food is placed within the plurality of food compartments. The plurality of food compartments are closed and locked. The elapse of a first time interval is determined, and responsive thereto the attractant stimulus is generated and a first one of the plurality of food compartments is unlocked, the unlocking being subsequent to placing, closing and locking. The elapse of a second interval subsequent to the first interval elapse is determined, and responsive thereto, the first one of the plurality of food compartments is locked. The elapse of a third interval subsequent to the second interval elapse is determined, and a second one of the plurality of food compartments is unlocked responsive thereto.

OBJECTS OF THE INVENTION

A first object of the invention is to provide an automatic feeder. A second object of the invention is to combine stimulus together with food availability for the training of animals. Another object of the present invention is to further combine a timing component, to further train those animals who are capable with respect to a general time or times. A further object of the invention is to train animals to be at a particular place at or about a particular time each day. Another object of the invention is to vary the food which is delivered to the bear, to better maintain the bear's interest. An even further object of the invention is to provide a feeder which is resistant to weather and animal attack, to thereby preserve food and protect control components. Yet another object of the present invention is to achieve the foregoing objectives while providing a training feeder specifically adapted to the training of wild bears.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 1 illustrates a preferred embodiment bear training device in accord with the teachings of the present invention.

FIG. 2 illustrates the preferred method for bear training using the preferred bear training device of FIG. 1.

DESCRIPTION OF THE PREFERRED EMBODIMENT

Manifested in the preferred embodiment wild bear training apparatus, the present invention provides a protective housing that surrounds a timer, scent dispenser, and door release actuators. The doors fit tightly enough to the housing when closed to prevent a bear from wedging a food compartment door open prematurely. Materials chosen for the preferred embodiment on surfaces available to a bear are all very hard, tough, and rigid, with metal preferred to prevent chewing through, and are of sufficient strength to indefinitely withstand attempts at surreptitious entry by a bear of the type being trained.

In a most preferred embodiment of the invention illustrated in FIG. 1, bear training device 100 is a rectangular prism separated into compartments by internal dividers 102. In the preferred embodiment bear training device 100, internal dividers 102 might, for exemplary purposes only and not limited thereto, separate the bear training device 100 into eight equal sized compartments comprised of seven food compartments 104 and a control compartment 109. Food compartments 104 define enclosures that prevent animal access to other food compartments or into a given compartment, except through a predetermined access port. Preferably, the control compartment 109 contains a scent dispenser 105, a scent outlet 106, a feeding timer 107, and a maintenance access door 108. Food compartments 104 have doors 103 that serve as the access ports into the enclosures that comprise food compartments 104. These doors 103 are locked and unlocked through a locking mechanism which is preferably controlled by feeding timer 107. In addition, preferred embodiment bear training device 100 has a protective housing 101 fabricated from metal or any another suitably rigid, weather resistant, durable, and long lasting material to protect from both the vagaries of weather, and from any possible damage that a bear, invading chipmunk, squirrel or any other animal or insect might try to inflict.

The use of ordinary hinged doors 103 are preferred, since this type of access port provides preferential access to a bear. Few other animals have hands or other suitable means to open such a door. The provision of some type of catch, return, or other device which provides some nominal resistance to opening, such as a magnetic catch, a return spring, or other hardware and even weatherstripping commonly associated with a hinged door, may provide further preferential selectivity to bears, particularly where the force required to activate the catch or similar device is greater than can ordinarily be generated by small rodents. The additional use of smooth metal for the material of door 103, and consideration of the same for protective housing 101, also provides preferential selectivity for bears. The smooth metal surface prevents claws or the like from being able to pull on and gain access through the door. Other access ports known in the art of buildings, cabinets and the like which offer preferential access to bears are also contemplated herein.

As shown in the preferred method illustrated by flow chart in FIG. 2, and after choosing an ideal location, bear training device 100 should be anchored, preferably by attaching it to a building, chaining it to a tree or post, staking, or another appropriate means, as shown in step 201. Next, as shown in step 202, food compartments 104 are filled with food. In the most preferred method, each compartment 104 is filled with a different variety of bear food, such as corn, old produce, day old donuts or bread, and other suitable food. By providing a different food in each compartment, a bear will be less likely to grow tired of the food, and so will be more likely to keep returning to bear training device 100. Most preferably, this filling step will occur at a time well removed from the regular feeding time, to help reduce the likelihood of undesirable human interaction with a hungry bear.

In addition to filling food compartments 104, scent dispenser 105 should also be filled with a suitable bear attractant. Preferably, the scent would not match one that is normally found in the bears' environment, or in the nearby environment. While scent dispenser 105 is shown, any suitable attractant or method may be used.

In preferred step 203, compartment doors 103 are then closed and secured. Timer 107 is then activated at step 204 of the preferred method. Timer 107 might, for exemplary purposes, be comprised by a twenty-four hour timer that includes both an unlocking time and an interval time before the lock is reset. In use, timer 107 would then cause the scent dispenser 105 to be activated and the scent dispersed through the scent outlet 106. At or reasonably close thereafter, one of the doors 103 is then unlocked, as described in step 205. For exemplary purposes, and not limiting thereto, in the preferred embodiment, one door 103 would unlock every twenty-four hours, and after a set period of time, such as an hour, be re-locked. This provides a one-hour window during which the food within the single compartment is accessible. The limited time window forces the bear to learn to come right away when the scent is released. Additional obstacles, including the size of doors 103, or other similar or suitable obstacles, may be provided in order to prevent the food from being too easy to remove. By making the food harder to remove, a bear will stay longer than otherwise.

Setting the time to a consistent time of day, whether exactly the same time or adjusted for such factors as changing sunrise and sunset times, will help to train the bear to pursue food at or around that same time. Consequently, the bear may learn not only to respond to the stimulus such as scent, but also to the general time of day.

In the preferred embodiment, each door 103 may be unlocked once, and then re-locked. After being unlocked and re-locked, and after the next twenty-four hour cycle has elapsed, timer 107 will most preferably activate a different one of the doors 103. After all of the doors 103 are sequentially unlocked, in the preferred method, a person would then choose to continue the process, starting back at step 202 by refilling the food compartments and scent dispenser, or continue to step 206 and remove the bear training device 100 for off-season storage, movement to a new location, cleaning, maintenance, or other task.

In addition to these figures and foregoing descriptions, several additional features and options are contemplated herein. First of all, bear training device 100 can be made to include any number of mechanisms. For exemplary purposes only, and not limited solely thereto, a motor or motive source may be provided to open and close door 103 when scent is released. A sensor may be provided to detect if the food is removed, allowing for a compartment 104 to be reused if a bear did not come the first time. The motor may be overload protected to keep it from being damaged if the door 103 is for any reason blocked. Furthermore, a remote control could be used to initiate, change, or cease the timing operation, or even open a special "goody" compartment to keep the bear there longer if so desired. The remote might be linked using any known means, including radio waves, optical signals, ultrasonic signals, a plug-in interface, a cable, or other suitable means. In addition, the timer and control circuitry may be located in a remote location, using wired or wireless means to activate door and scent releases. All of the mechanical items may be driven using any suitable mechanisms and energy sources, including for exemplary purposes, but not limiting thereto, batteries with or without solar recharging capabilities.

While the inclusion of a motor may at first appear to be most desirable, this is not the most preferred embodiment. The opening of the doors is a task that many other animals can not accomplish. An inquisitive bear who can smell food within compartment 104, however, will readily open the unlocked door 103. With appropriately sized compartments 104, the bear will remove all food present therein. Consequently, in many cases bear training device 100 will serve as a more selective feeder by not providing automatic opening of the unlocked door 103.

The specific material used in the fabrication of bear training device 100 may vary as well, though special benefits are attainable if several important factors are taken into consideration. First, bear training device 100 should be sufficiently waterproof to continue to function and also to preserve both food and attractant from damage if it rains. It also should be sturdy, durable, abrasion resistant, and sufficiently durable to protect it from any damage hungry animals might cause attempting to access the food inside. Furthermore, food held within food compartments 104 will most preferably not overheat and spoil if bear training device 100 is placed in the sun, and the exterior should stay sufficiently cool to permit a bear to touch it during a hot and sunny day. Bear training device 100 is not limited in shape, color, ornamentation or decoration. For exemplary purposes only, and not limiting thereto, bear training device 100 could also be built to resemble a bird house in shape, providing some protection both from the sun and the rain. In addition, where a tighter seal of doors 103, 108 is desired additional features may be provided to ensure tight engagement. These additional features may include interlocking tapers, gaskets, weatherstripping, or other such features as may be known in the art of coupling and which may be desired herein.

Food compartments 104 may be constructed to rotate or translate in front of a single door 103, rather than having multiple food compartments with their own respective doors. However, with such design it will be necessary to provide a strong and durable rotary structure, to withstand prying and forcing by a bear. Another possibility exists that the food compartments 104 could be modularly attached to the wild bear training device 100 to allow for easy adjustment of the number of feedings available. These food compartments are contemplated to engage or disengage mechanically by latches or other suitable interlock to reduce the amount of human maintenance or setup time. Another method to reduce the amount of operator time, exemplary of the many possibilities for different embodiments of the present invention that have been considered herein, is an entrance to compartments 104 separate from and in addition to doors 103. Such a separate entrance might, for exemplary purposes, be larger, allowing the operator to easily clean and fill the compartments. The separate entrances could be either individual, or expose several or all of the compartments at one time.

Many means may also be incorporated to make the food more palatable. Any known means can be used, such as hydration of dehydrated foods, molasses added to feed when the door is unlocked, or cooling of compartments 104 through any means, such as freezer packs, vents, or refrigeration, thereby allowing for food such as meat to be used, if appropriate. The food itself may be provided in detachable food compartments, or in prepackaged packets that allow for easy preparation, distribution, and sales.

Several additional features that are suitable for use with or as an alternative to scent dispenser 105 include, for exemplary purposes but not limited thereto, a blower driven or ultrasonic dispersion of scent, or even a separate dispenser relocated to a different and possibly higher location so to be out of the bears' reach and allow for a wider dispersion of smell. Other means of signaling food availability are also considered, in combination or independently, including, but not limited to a sound or sounds, vibrations through the ground, lights, or other means detectable by a bear's senses.

A timer interlock control feature might also be implemented that disables the unlocking of the food compartment doors 103 if the bear training device 100 is not standing upright, preventing a mess if tipped, and not encouraging the behavior if the bear caused it. In addition to the timer interlock control feature, a signal may be implemented too, to alert the operator remotely that the interlock control feature was triggered.

Several benefits are provided by bear training device 100 that may not be apparent from the foregoing description. First, it allows for unattended training of the bear for arrival at the feeder at either a certain time, or in response to a certain attractant, with maintenance required only to refill both food and scent materials. Since there is very little human intervention required, such as a once-weekly filling, bear training device 100 may be filled on week-ends prior to the actual hunting expedition. As aforementioned, this filling will preferably occur at times of day that are very different from the times when bear training device 100 dispenses food. In this way, a hunter may safely fill the feeder, and have expectation that the bear or other wild animal will be at or near bear training device 100 at a particular time each day.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. For exemplary purposes, while feeding timer 107 has been disclosed to provide a once-daily feeding, it will be appreciated that any suitable time intervals may be used, and that an appropriate number of compartments may be provided to match the desired feeding intervals and refill cycle. While described most particularly with reference to bears, the present invention will be applicable to other animals as well. Most preferably, the present invention will be used with animals that may be trained to respond to the attractant, whether for hunting or for other purpose, and that also may be trained with respect to general times of day. Further, features and design alternatives that would be obvious to one of ordinary skill in the art are considered to be incorporated herein. The scope of the invention is set forth and particularly described in the claims herein below.

I claim:

1. A bear training apparatus suitable to train a bear to visit a specific location at a specific time interval, comprising:
   at least two feeding compartments;
   a first one of said at least two feeding compartments having an enclosure blocking animal access to contents stored therein, at least one access port in a first state permitting said bear access into said enclosure for gaining access to said contents through said access port while simultaneously resisting animal access and in a second state preventing access into said enclosure, and a lock selectively maintaining said access port in said second state when said lock is in a locked state and permitting said access port to change from said first state to said second state when in an unlocked state, wherein said at least one first feeding compartment access port further comprises means for providing preferential access to a bear, wherein said means for providing preferential access to a bear further comprises a means for providing nominal resistance to opening said at least one first feeding compartment access port, wherein said nominal resistance is greater than can ordinarily be generated by small rodents;

a second one of said at least two feeding compartments having an enclosure blocking animal access to contents stored therein, at least one access port in a first state permitting said bear access into said enclosure for gaining access to said contents through said access port while simultaneously resisting animal access and in a second state preventing access into said enclosure, and a lock selectively maintaining said access port in said second state when said lock is in a locked state and permitting said access port to change from said first state to said second state when in an unlocked state;

a stimulus indicative of the availability of food;

a stimulus control generating said stimulus;

a lock control coupled with a first generating of said stimulus for changing said first feeding compartment lock from said locked state to said unlocked state and, after a first predetermined time interval, automatically changing said first feeding compartment lock from said unlocked state to said locked state, said lock control coupled with a second generating of said stimulus at a second predetermined time interval subsequent to changing said first feeding compartment lock from said unlocked state to said locked state for automatically changing said second feeding compartment lock from said locked state to said unlocked state.

2. The bear training apparatus of claim 1, wherein said at least two feeding compartments contents further comprises food.

3. The bear training apparatus of claim 1, wherein said at least one first feeding compartment access port further comprises a door.

4. The bear training apparatus of claim 3, wherein said door further comprises a hinged door.

5. The bear training apparatus of claim 1, further comprising a motor operatively coupled to and suitable for changing said at least one access port from said first state to said second state.

6. The bear training apparatus of claim 1, wherein said stimulus control generates said stimulus at a preselected time.

7. The bear training apparatus of claim 6, wherein said stimulus preselected time is adjustable.

8. The bear training apparatus of claim 6, wherein said stimulus preselected time is adjustable to variations in daylight.

9. The bear training apparatus of claim 1, wherein second time interval is greater than said first time interval.

10. The bear training apparatus of claim 1, wherein said lock control after a third time interval changes said second feeding compartment lock from said unlocked state to said locked state.

11. The bear training apparatus of claim 1, wherein said stimulus comprises an attractant.

12. The bear training apparatus of claim 11, wherein said stimulus attractant comprises a scent.

* * * * *